Dec. 17, 1946.　　　　F. PARRY　　　　2,412,747
MACHINE FOR CHARGING CLIPS WHICH FORM
THE LINKS OF CARTRIDGE BELTS
Filed Feb. 25, 1942　　　　7 Sheets-Sheet 1

Inventor
Frank Parry
By
Watson, Cole, Grindle & Watson
Attys.

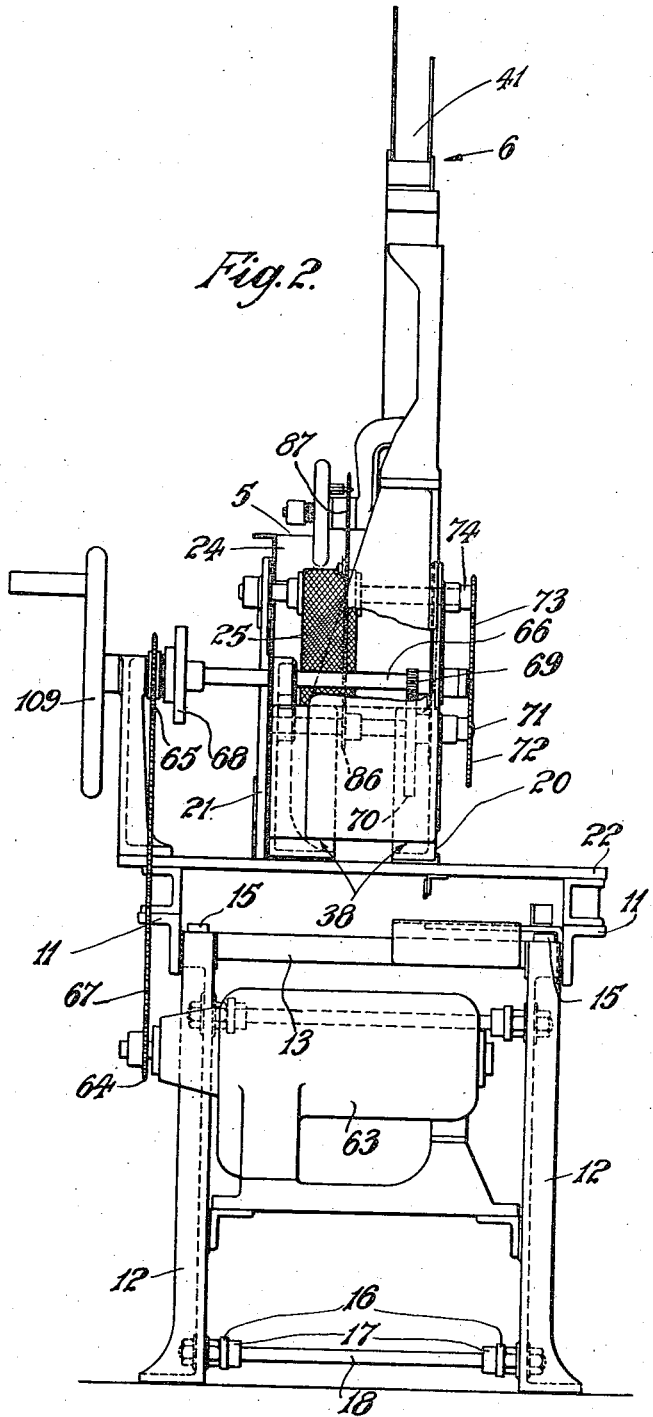

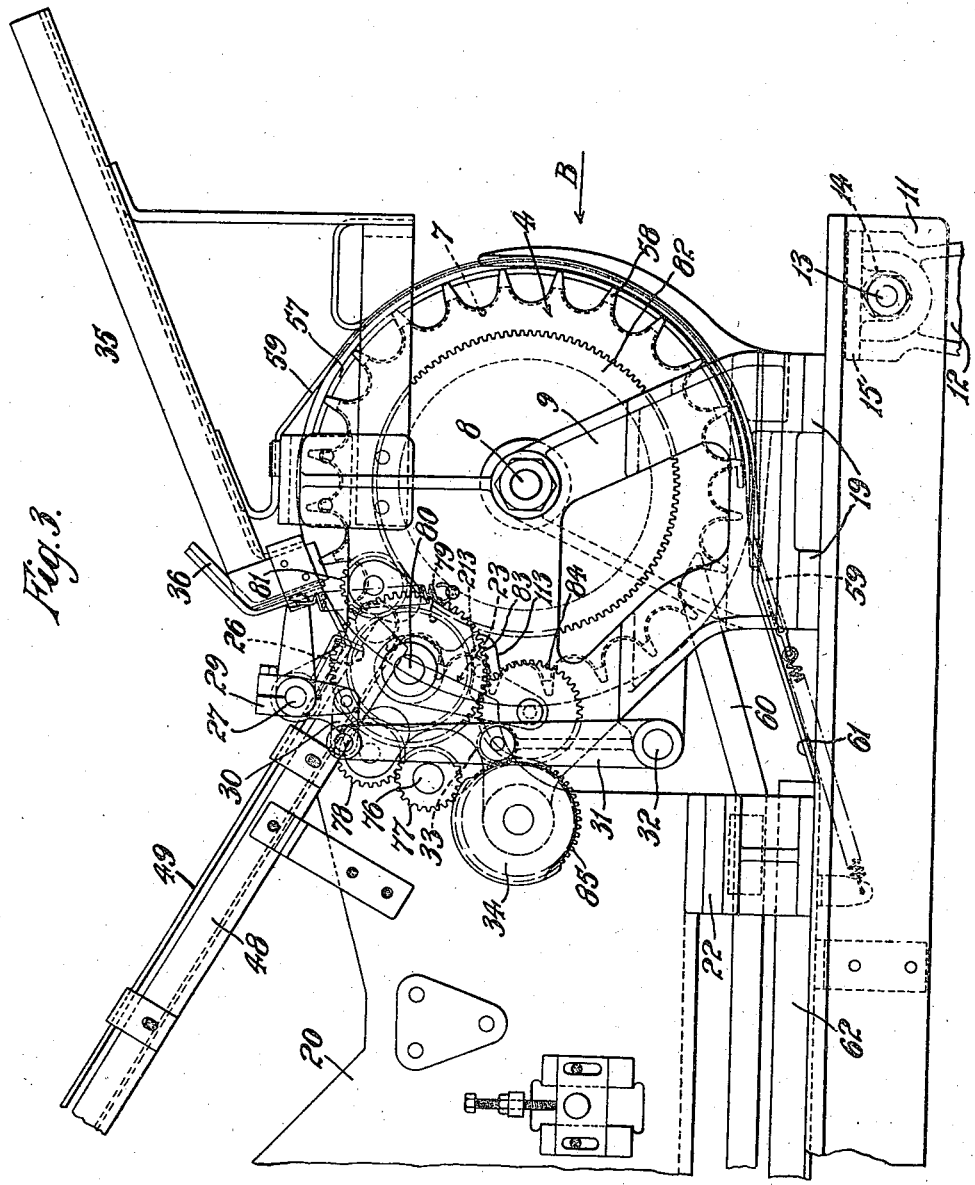

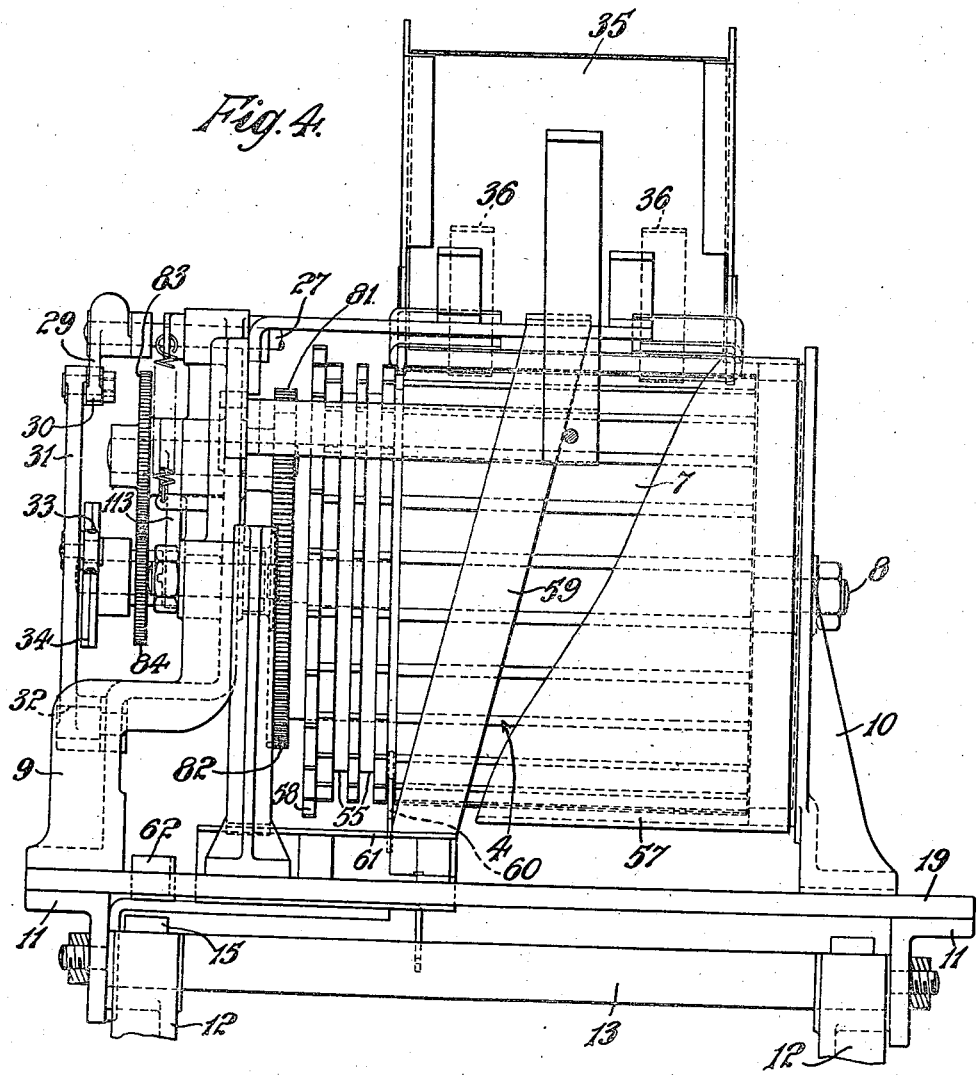

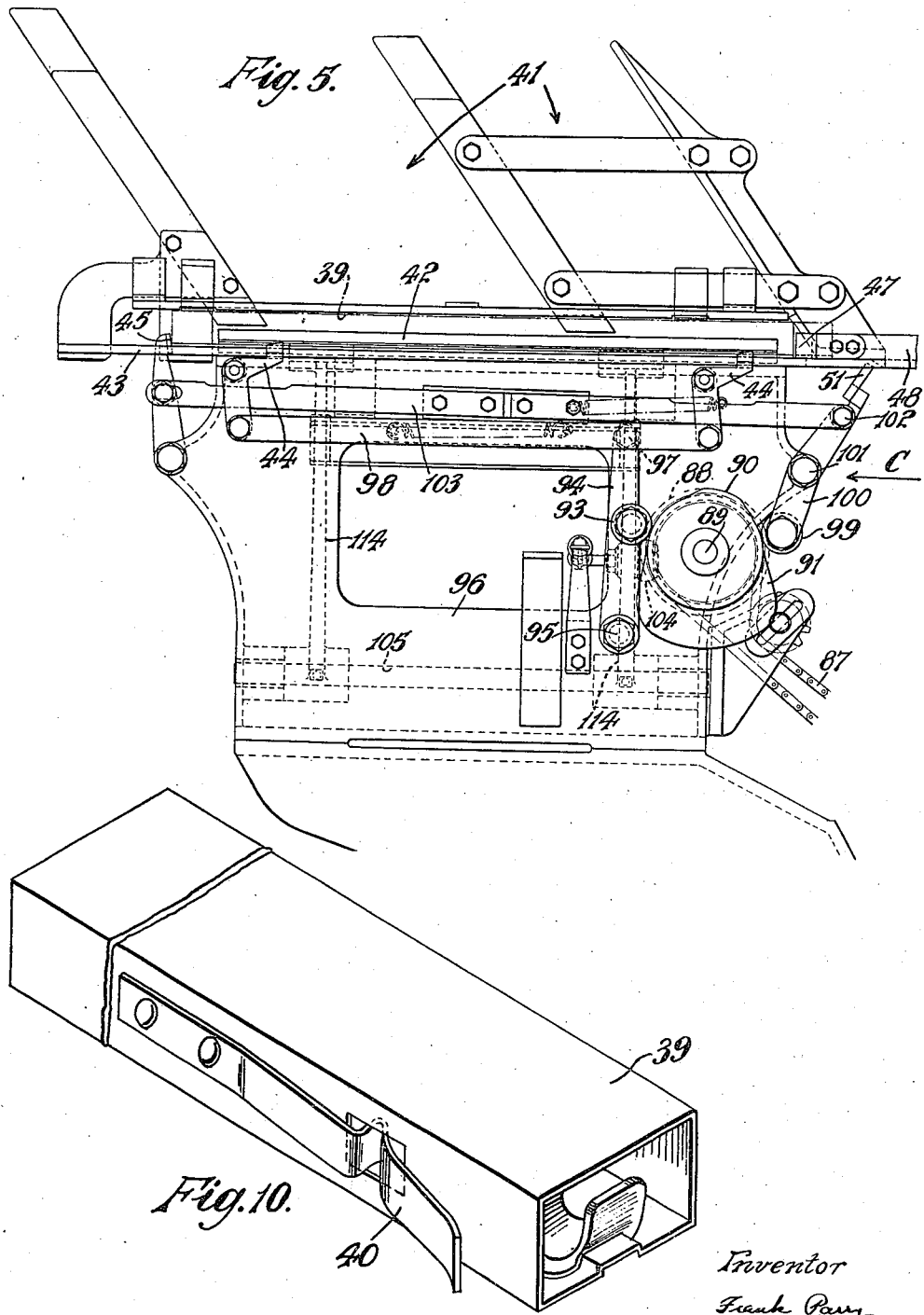

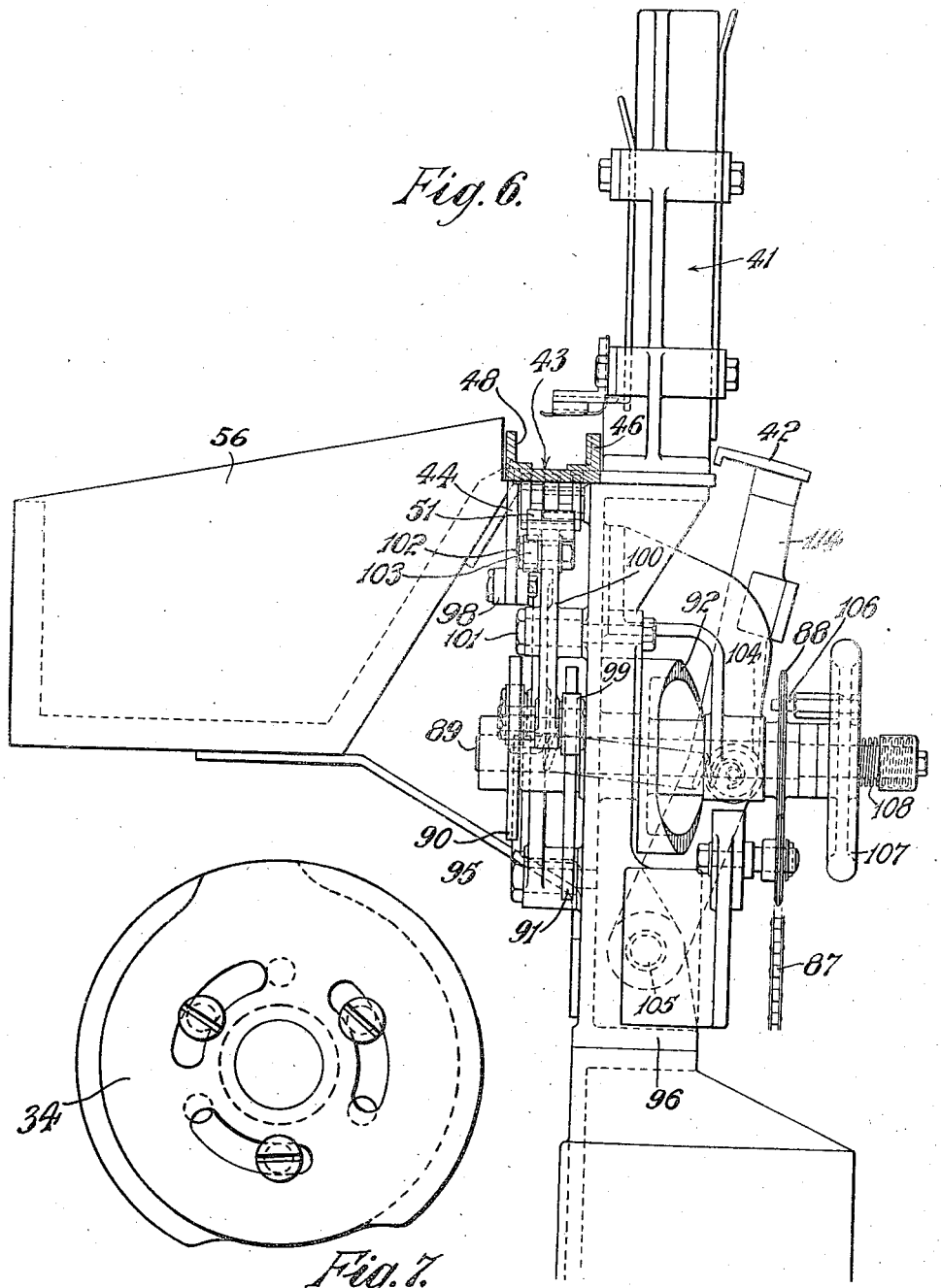

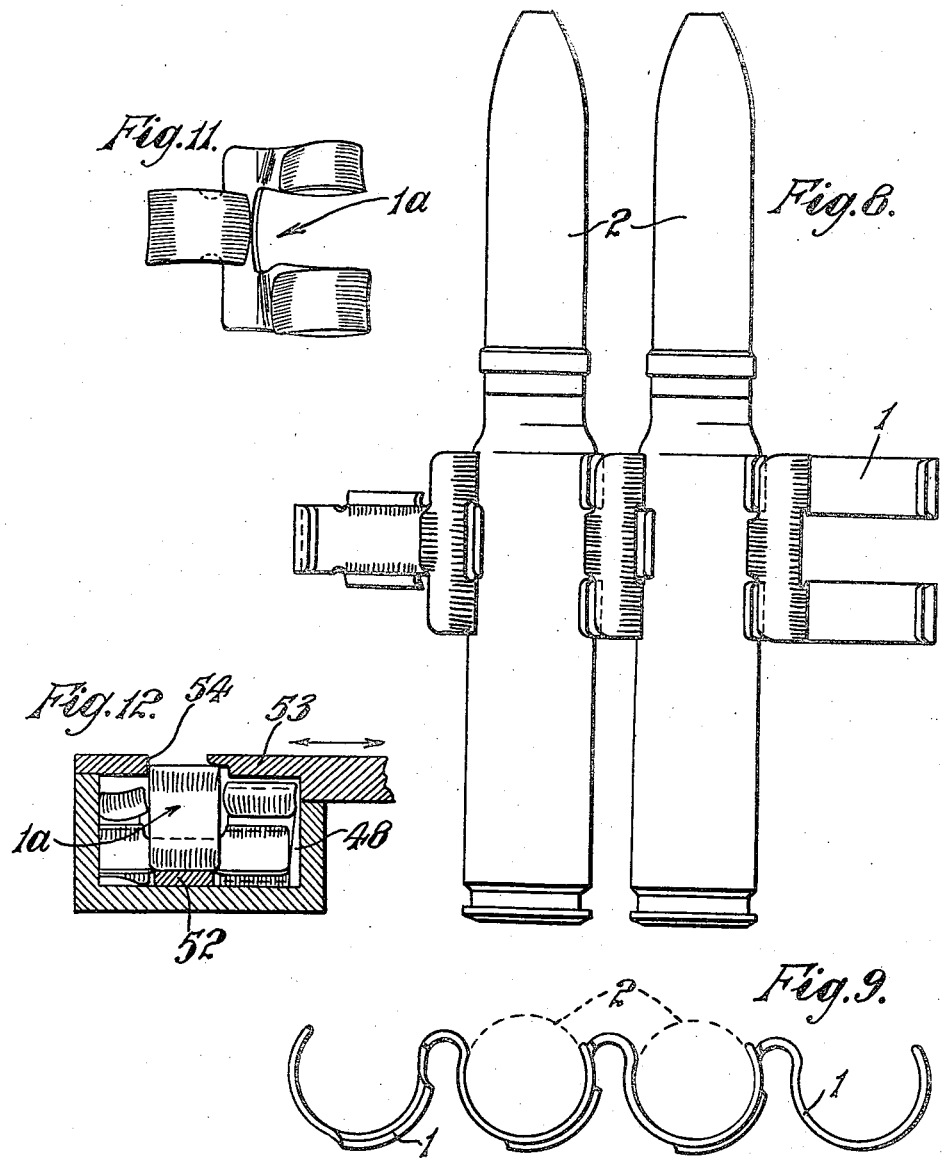

Patented Dec. 17, 1946

2,412,747

UNITED STATES PATENT OFFICE 2,412,747

MACHINE FOR CHARGING CLIPS WHICH FORM THE LINKS OF CARTRIDGE BELTS

Frank Parry, Deptford, London S. E. 8, England, assignor to Molins Machine Company, Limited, Deptford, London, England Application February 25, 1942, Serial No. 432,358
In Great Britain February 26, 1941

4 Claims. (Cl. 86—48)

This invention concerns improvements in or relating to machines for charging clips which form the links of cartridge-belts for automatic guns.

It is an object of the present invention to provide a clip charging machine which is capable of a relatively high output, which is easily movable from one place to another, which may be manually operated where no mechanical motive power can be provided and which requires a minimum of manual labour in its operation.

According to the invention there is provided a machine for charging clips appertaining to cartridge-belts for automatic guns, comprising a charging unit having pockets (e. g. flutes) adapted to receive and locate similarly oriented clips and a succession of cartridges each of which has its nose facing a clip, the charging unit including means to move the cartridges endwise into the clips lying opposed to them, a cartridge-feeding unit, a clip-feeding unit to deliver oriented clips, driving means (e. g. flexible driving means) adapted to connect said units for operation from a single source, said units being readily detachable from each other for the purpose of transferring the machine from one place to another, and means for maintaining reserves between the charging-unit and the cartridge-feeding unit and between the charging-unit and the clip-feeding unit, said means being arranged adjacent the charging-unit and arranged to feed the reserves yieldingly against the charging-unit.

By the provision of means for maintaining these reserves of cartridges and clips, it is unnecessary to ensure any timing between the various units when they are assembled. The coupling-up of the driving means will ensure that the various units will operate in synchronism, but the reserves will ensure that the charging-unit is properly fed during starting up, after which the cartridge and clip feeds will supply the reserves.

An interrupter device driven by gearing coupled to the charging unit may be provided which is adapted to prevent feeding of cartridges to the cartridge feeding unit at predetermined intervals so that cartridges from a further source of supply may pass into pockets which do not receive cartridges from the cartridge feeding unit.

The machine may be adapted for driving by a motor or the like with provision for alternative manual operation with a free wheel device in the drive to permit this.

One embodiment of the invention will be described by way of example with reference to the accompanying drawings which show a machine for assembling a disintegrating cartridge-belt.

In the drawings:

Figure 2 is an end elevation of Figure 1 taken in the direction of the arrow A.

Figure 3 is a front elevation of the charging-unit.

Figure 4 is an end elevation of Figure 3 taken in the direction of the arrow B.

Figure 5 is a front elevation of the clip feeding unit.

Figure 6 is an end elevation of Figure 5 taken in the direction of the arrow C.

Figure 7 shows a detail of Figure 5.

Figures 8 and 9 show a plan and elevation respectively of a portion of a disintegrating cartridge-belt.

Figure 10 is a perspective view of part of a clip charger.

Figure 11 is a plan of a clip for cartridge belts.

Figure 12 is a cross section of a chute suitable for feeding clips of the kind shown in Figure 11.

Like reference numerals refer to like parts throughout the several figures of the drawings.

Figure 1:
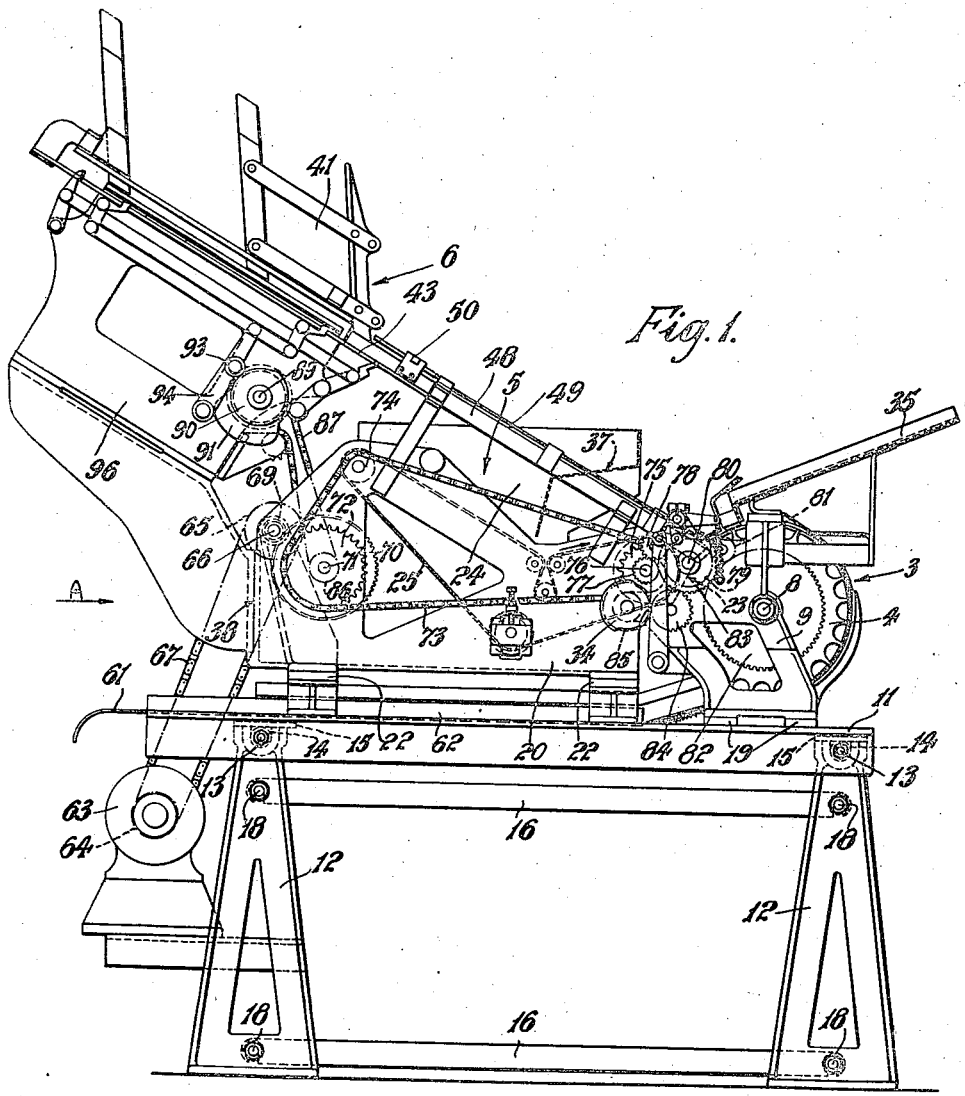
Figure 1 is a front elevation of the complete machine drawn to a small scale.

Referring to the drawings, a cartridge-belt is formed by clips 1 which are linked together by cartridges 2 in the manner shown in Figures 8 and 9. The machine, see Figure 1, comprises three units, the main unit being the charging-unit 3 which, briefly, comprises a rotatable fluted drum 4 adapted to receive aligned clips and cartridges and means to insert the cartridges into the clips, a cartridge-feeding unit 5 adapted to deliver cartridges into the flutes of the said rotatable drum, and a clip-feeding unit 6 adapted to deliver similarly oriented clips into the flutes of the rotatable drum. The three units are detachable from one another so that when it is desired to transfer the machine from one workplace to another, this can be done with the minimum of trouble, although the machine is, when assembled, a relatively heavy machine.

The drum of the charging unit has peripheral flutes 7, see Figures 3 and 4, which are parallel to the axis of rotation of the drum and the drum is rotatably mounted on a shaft 8 fixed in bearings in frames 9 and 10. These frames are fixed to cross-bars 19 which are secured to a pair of spaced angle irons 11 supported on legs 12. The angle irons are spaced apart from each other and secured to bars 13 adapted to be slipped into grooves 14 in the legs. Clamp plates 15 are provided to retain the bars in position in the grooves in the legs when the machine is assembled. When it is desired to transfer the machine, the legs can be removed from the angle irons by undoing the bolts which fix the plates 15 to the legs. The pairs of legs which support the extremities of the angle irons are further tied together by flat stays 16 which can be quickly removed by loosening collars 17 on the round stays 18 Figure 2, whereupon the flat stays, which are slotted, may be lifted off the round stays.

The cartridge-clips and cartridges are delivered to the flutes 7 of the drum as described later and, when in the flutes, the clips are similarly oriented and aligned with each other and the cartridges lie one in each flute with their noses directed towards the aligned clips.

The frames 20 and 21 respectively of the cartridge-feeding unit are fixed to cross bars 22 similar to the cross bars 19 and these cross bars 22 are bolted to the angle irons 11 and provided with dowels so that the cartridge-feeding mechanism can be easily disconnected from the angle irons. The frames of the cartridge-feeding unit are also bolted and dowelled to the frames 9 and 10 of the charging-unit at 23 and thus, after removal, the cartridge-feeding unit can readily be replaced again and accurately aligned therewith. The cartridge-feeding unit shown is the same as that described in the co-pending British patent application No. 2269/41 and only a brief description thereof will be given here.

The frames 20 anad 21 support a hopper 24 having a plate 37 thus forming a box like structure. An endless travelling band 25 is mounted between the frames and the left-hand portion (Figure 1) of the upper run thereof in conjunction with the plate 37 forms the support for the cartridges in the hopper. The cartridges leave the hopper in the gap between the band 25 and the bottom of the plate 37. The band moves in the direction of the arrow and feeds the cartridges one at a time into the flutes 7 of the drum of the charging-unit. This endless band conveyor or transfer-device constitutes the means previously referred to for maintaining the reserve of cartridges between the charging-unit and the cartridge-feeding unit. The band 25 of the transfer-device feeds the reserves yieldingly against the drum of the charging-unit. When it is desired that the cartridge-belt shall not be entirely composed of cartridges of a similar kind, means may be provided periodically to interrupt the delivery of cartridges into the drum flutes from the reserve on the transfer-device so that a cartridge is not delivered into one of the drum flutes 7. This flute subsequently receives a cartridge of a different kind, e. g. a cartridge containing a tracer bullet, from a different source of supply at a later stage.

Referring to Figures 3 and 4 the interruption of the delivery of cartridges from the reserve is effected by a hooked plate 26 which is fixed to a spindle 27 pivotally mounted in the frame of the charging-unit. To the spindle 27 there is secured a lever 29 whose free end is pivoted to a link 30. The other end of the link is connected to one end of a cam lever 31 pivoted at 32 to the frame 9. A roller 33 on the lever engages a cam 34 which thus causes the plate 26 to be oscillated at intervals, say after every fifth cartridge has been delivered to the fluted drum, and the hooked portion of the plate then prevents the feeding of a further cartridge until one flute has passed the cartridge-delivery position. The empty flute receives a cartridge from a further supply which comprises a downwardly directed support 35 and guide-elements 36, which latter guide a cartridge into the empty flute when the latter passes beneath the guide-elements.

The cartridges between the guide-elements 36 are, normally, resting against the fluted drum and ride over the cartridges which are delivered to the drum from the transfer-device 25. This arrangement causes the cartridges between the guide-elements 36 to be agitated by the action of riding over those already received by the drum and this agitation assists the movement of the cartridges between the guide-elements towards the drum.

The clips are delivered to the fluted-drum by the clip-feeding unit 6 which is bolted and dowelled at 38 to the frames of the cartridge-feeding unit so as to be readily detachable therefrom. The clips are contained in chargers consisting of long rectangular boxes 39 having one end open, see Figure 10. A resilient catch 40 located near the open end of the charger is provided to retain the links within the charger. The links are similarly oriented when they are placed into a charger so that when they are delivered therefrom, they are delivered to the flutes of the drum in the desired arrangement.

The chargers are superimposed in a magazine 41, Figures 5 and 6, and a pusher 42 is arranged to move the lowermost charger from the bottom of the magazine and to move it transversely of its length on to a platform 43 which is inclined downwardly towards the fluted drum. Mechanically operated stops 44 are provided to locate the charger laterally in position on the platform while a guide-element 51, described below, forms a guide for the downwardly directed (i. e. the open) end of the charger. When the charger is in position on the platform, the rear end of the charger is engaged by a pusher-element 45 which moves the charger lengthwise and in a downward direction for a short distance and into engagement with projections 46 and 47, one of which, 46 (which is formed by recessing the wall of the chute 48 referred to below and indicated in dotted lines on Figure 6) engages the leading end of the charger and locates it in position while the other, 47, Figure 5, which is of wedge shape, causes the resilient catch to be moved outwards from the wall of the charger so as to release the clips contained in the charger. During the downward movement of a charger the element 51 moves with it as a controlling device until the open end of the charger almost engages the projections 46 and 47 when the element 51 moves on to clear the charger opening. On being released, the clips fall by gravity down an inclined chute 48 the base of which constitutes an extension of the platform 43 and the lower end of which is located in close proximity with the fluted drum, see Figures 1 and 3. This downwardly inclined chute constitutes the means referred to above for maintaining a reserve of clips between the charging-unit and the clip-feeding unit and feeds the clips yieldingly against the charging unit. The interior surfaces of the chute are suitably shaped to ensure that the clips 1 are maintained in alignment and a top wall 49 is arranged to keep the clips down. A part 50 of this top wall is hingedly mounted, see Figure 1, to allow the reserve to be built up by hand, prior to starting up the machine. It should be understood that there are numerous kinds of clips in use at the present time and their shape varies according to the shape and kind of cartridges with which they are to be used and also according to the ideas of the designers and makers of the clips, cartridges or machine-guns. In some cases, therefore, the chute described above will not satisfactorily feed particular kinds of clips. For example, the clip 1a shown in Figure 11 is so irregular in shape and the dimensions of individual clips in a batch so vary that special means are necessary to align the clips in order to obtain satisfactory feeding. To enable such clips to be fed satisfactorily the chute 48 is therefore made with the cross-section shown in Figure 12 where a central rib 52 raises the middle loop of the clip and a stepped mechanically operated plunger 53 intermittently presses the clip against the opposite wall of the chute. The pressure is sufficient to bring the width of all clips to the same dimension and the upper step of the plunger presses the middle loop against the edge 54 of the top guide (which constitutes a datum) and thus all the clips are properly aligned and "sized."

The flutes of the drum 4 are so constructed that at the position at which the clips are received thereby, the ribs which separate adjacent flutes are reduced in dimension and the shoulders of the clips are located by these reduced portions. For example, in Figure 4 it will be seen that the flutes which receive the clips are subdivided by two deep peripheral grooves 55. The central fluted disc thus obtained engages the central portion of the single member of the clip 1 while the two ribs thereof lie in the grooves 55. The two outer fluted discs engage the two other members of the clip. If desired, this portion of the fluted drum may be differently shaped or constructed to suit any minor differences in the varieties of clips at present in use.

When a charger has been emptied, the guide-element 51 which engaged the leading end of the charger during its lengthwise-downward movement, is caused to move the empty charger lengthwise in a rearward direction so that it is aligned with the next loaded charger which is to be moved into position on the support or platform 43. As the next succeeding loaded charger is moved on to the platform, it moves the empty one laterally from the platform and the empty charger is delivered to some suitable position, for example it is caused to fall into a receptacle 56, Figure 6. Clips from the newly presented charger are released as in the previous case.

The fluted drum 4 is kept supplied with clips and cartridges by the mechanism described above, and rotation of the drum causes the bases of the cartridges to engage a fixed cam 57, Figure 4, which moves the cartridges lengthwise along the flutes and into the clips, thus forming a cartridge belt. A fluted disc 58 provides a reaction surface to hold the clips in alignment during this operation. A flexible strap 59 holds the resulting belt against the drum until at the lowest position reached by the drum flutes the belt falls away from the flutes. A stripper 60 is provided to ensure positive removal of the finished belt which then moves along a plate 61 being guided by a guide 62.

Since the machine comprises three separate units, flexible driving-means is provided to drive the assembled driving units. This driving-means comprises a chain drive.

The machine may be driven by hand or power, the latter being preferable where conditions permit though for short runs, hand power is quite satisfactory. As shown in Figures 1 and 2 an electric motor 63 is provided, supported on one pair of legs 12. The motor may be easily detached for transport. A sprocket wheel 64 on the motor shaft drives a sprocket 65 on a counter-shaft 66, journalled in the frames 20 and 21, by a chain 67. The sprocket 65 is a free wheel sprocket, for a purpose explained later. A clutch 68 on the counter-shaft 66 is provided and arranged to break under a certain load to avoid damage if jamming should occur. A small gear wheel 69 on the counter-shaft 66 engages a larger gear wheel 70 on a shaft 71 also journalled in the frames 20 and 21. The outer end of the shaft 71 has fixed thereto a sprocket wheel 72 on which a chain 73 runs. This chain passes around other sprockets 74 and 75 which are fixed to the spindles of rollers on which the endless band 25 is carried as explained in detail in the specification referred to. Thus the cartridge feeding unit is driven from the main drive and in separating this unit from the frame of the machine the breaking of the drive merely involves uncoupling the chain 67.

On the outer end of one of the band roller spindles, marked 76, there is fixed a small gear wheel 77, see also Figure 3, which engages a similar gear wheel 78 rotatably mounted on the frame 9 of the charging unit. This gear wheel engages with a larger gear wheel 79 similarly mounted on a spindle 80 which passes through the frame 9. The gear wheel 79 also engages a small gear wheel 81 rotatably mounted on a pin in the frame 9 and this small gear wheel in turn engages with a large gear wheel 82 which is fixed to the drum 4. The spindle 80 also has fixed thereto on the outside of frame 9, a larger gear wheel 83 which engages an intermediate gear wheel 84 rotatably mounted on a pin fixed to a quadrant plate 113 pivoted on the spindle 80 and arranged to be clamped in position by a bolt acting in the curved slot 213, Figure 3.

The intermediate gear wheel drives a further gear wheel 85 to which is fixed the cam 34. The gear wheels 83 and 85 may constitute change gears, that is gear wheels having different numbers of teeth may be substituted for the gear wheels shown, in order to vary the ratio of the number of strokes of the hooked plate 26 per revolution of the drum 4, thus enabling different ratios of the cartridges provided by the hopper 24 and the supplementary feed chute 35 to be achieved. When changing the gear wheels 83 and 85 the angular position of the quadrant will be suitably adjusted. The cam 34 is preferably formed as shown in Figure 7, by two superimposed cam discs which can be angularly adjustable with respect to one another. In this way the timing (i. e. the period of dwell at the up and down positions) of the hooked plate per revolution of the cam may also be varied as both discs engage the common roller 33. Thus all the charging unit mechanism is driven from the cartridge feeding mechanism but when the charging unit is removed from the machine it is only necessary to take it off and the drive is broken by the simple disengagement of the gear wheels 77 and 78.

The clip feeding unit is driven by a chain drive comprising a sprocket wheel 86 fixed on the shaft 71 previously mentioned, a chain 87 passing round this sprocket wheel and a further sprocket wheel 88, see Figures 5 and 6, mounted on the cam shaft 89 of the clip feeding unit. On the camshaft are fixed two plate cams 90 and 91 and a crown cam 92 see Figure 6. The cam 90 engages a roller 93 mounted on a lever 94 pivoted at 95 to the frame 96 of the clip feeding unit. The other end of the lever 94 is connected at 97 to a link 98 which couples the ends of the bell crank levers on which the stops 44 are formed. The cam 91 engages a roller 99 on a lever 100 pivoted at 101 to the frame 96. The other end of this lever has fixed thereto the guide-element 51 while at an intermediate point 102 the lever is pivoted to a link 103 to the other end of which is pivoted the pusher 45. The crown cam 92 is engaged by a roller 104 on one of a pair of arms 114 pivoted at 105 to the frame 96. To the upper ends of these arms there is fixed the pusher 42. Springs shown in Figures 5 and 6 effect the return movements by holding the rollers against their respective cams. The sprocket wheel 88 is loosely mounted on the camshaft 89 but is operatively coupled thereto by a pin 106 fixed in a handwheel 107 which normally enters a hole in the sprocket wheel 88. If it is desired to advance the rate of clip feeding relatively to the movements of the rest of the machine, the handwheel may be drawn backwards on its shaft against the pressure of the spring 108 and then turned for a revolution to feed a charger on to the platform 43 whereupon the pin once more springs into the hole. In this way the charger feed may be accelerated, for example, in cases where partly empty chargers have been supplied or in setting up the machine. With the driving arrangements described it is thus only necessary to uncouple the chain 87 when removing the clip feeding unit from the machine.

The machine is arranged to be driven by the motor but it is capable of being operated by hand, for example when the motor is stationary, to clear a jam or for temporary manual operation for, say, a short run, or if the power supply fails. The manual operation is effected by the handwheel 109 and the shaft 66 may be turned without moving the motor because of the free wheel sprocket 65. The reserve of cartridges and clips should be built up by hand before starting to operate the machine.

The machine above described is particularly suitable for charging cartridge-belts with cartridges of a fairly large calibre, e. g. the projectiles are of the order of ½ inch or 20 mm. or even larger.

What I claim as my invention and desire to secure by Letters Patent is:

1. A machine for charging clips appertaining to cartridge-belts for automatic guns, comprising a charging unit including a support having pockets receiving a succession of similarly oriented clips and a succession of cartridges with the nose of each cartridge facing a clip, and a device cooperating with said support to move the cartridges endwise into the clips lying opposed to them, said support and said device being relatively movable, a cartridge-feeding unit delivering cartridges to said support, a clip-feeding unit delivering oriented clips to said support, driving means connecting said units for operation from a single source, readily detachable means operatively associating said units, each of said units including an elongated, smooth surfaced conveyor arranged to deliver the articles being conveyed against said support to cause the articles to accumulate adjacent said support to form a reserve supply.

2. A machine for charging clips appertaining to cartridge-belts for automatic guns, comprising a charging unit including a rotatable drum having pockets adapted to receive and locate a succession of similarly oriented clips and a succession of cartridges with the nose of each cartridge facing a clip, and a device cooperating with said drum to move the cartridges endwise into the clips lying opposed to them, a cartridge-feeding unit for delivering cartridges to said drum, a clip-feeding unit to deliver oriented clips to said drum, driving means connecting said units for operation from a single source, readily detachable means for operatively associating said units, each of said units including an elongated, smooth surfaced conveyor arranged to deliver the articles being conveyed against said drum to cause the articles to accumulate adjacent said drum to form a reserve supply.

3. A machine for charging clips appertaining to cartridge-belts for automatic guns, comprising a charging unit including a rotatable drum having pockets adapted to receive and locate a succession of similarly oriented clips and a succession of cartridges with the nose of each cartridge facing a clip, and a device cooperating with said drum to move the cartridges endwise into the clips lying opposed to them, a cartridge-feeding unit for delivering cartridges to said drum, a clip-feeding unit to deliver oriented clips to said drum, driving means connecting said units for operation from a single source, said driving means including chain and sprocket gearing interposed between said cartridge feeding and clip feeding units and said source, readily detachable means for operatively associating said units, each of said units including an elongated, smooth surfaced conveyor arranged to deliver the articles being conveyed against said drum to cause the articles to accumulate adjacent said drum to form a reserve supply.

4. A machine for charging clips appertaining to cartridge-belts for automatic guns, comprising a charging unit including a support having pockets adapted to receive and locate a succession of similarly oriented clips and a succession of cartridges with the nose of each cartridge facing a clip, and a device cooperating with said support to move the cartridges endwise into the clips lying opposed to them, said support and said device being relatively movable, a cartridge-feeding unit for delivering cartridges to said support, a clip-feeding unit to deliver oriented clips to said support, driving means connecting said units for operation from a single source, said driving means including a one-way clutch device, and manually operable means disposed intermediate said clutch device and said units for driving the latter independently of said source; readily detachable means for operatively associating said units, each of said units including an elongated, smooth surfaced conveyor arranged to deliver the articles being conveyed against said support to cause the articles to accumulate adjacent said support to form a reserve supply.

FRANK PARRY.